(12) United States Patent
Bae et al.

(10) Patent No.: US 10,770,774 B2
(45) Date of Patent: Sep. 8, 2020

(54) MICROSTRIP-WAVEGUIDE TRANSITION FOR TRANSMITTING ELECTROMAGNETIC WAVE SIGNAL

(71) Applicant: KOREA ADVANCED INSTITUTE OF SCIENCE AND TECHNOLOGY, Daejeon (KR)

(72) Inventors: Hyeon Min Bae, Daejeon (KR); Ha Il Song, Daejeon (KR); Joon Yeong Lee, Daejeon (KR); Tae Hoon Yoon, Daejeon (KR); Hyo Sup Won, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/145,622

(22) Filed: Sep. 28, 2018

(65) Prior Publication Data

US 2019/0103647 A1    Apr. 4, 2019

Related U.S. Application Data

(63) Continuation of application No. PCT/KR2017/003338, filed on Mar. 28, 2017.

(30) Foreign Application Priority Data

Mar. 28, 2016  (KR) .................... 10-2016-0037121
Mar. 28, 2016  (KR) .................... 10-2016-0037141
Mar. 27, 2017  (KR) .................... 10-2017-0038747

(51) Int. Cl.
*H01Q 9/04*    (2006.01)
*H01P 5/08*    (2006.01)
(Continued)

(52) U.S. Cl.
CPC ............... *H01P 5/08* (2013.01); *H01P 3/081* (2013.01); *H01P 3/10* (2013.01); *H01P 3/12* (2013.01);
(Continued)

(58) Field of Classification Search
CPC .. H01Q 9/04; H01Q 13/06; H01P 5/08; H01P 3/08; H01P 3/10
(Continued)

(56) References Cited

U.S. PATENT DOCUMENTS 3,268,902 A     8/1966   Turrin
3,703,690 A    11/1972   Ravenscroft et al.
(Continued)

FOREIGN PATENT DOCUMENTS

CA    2449596 A1    6/2005
CN    1365160 A     8/2002
(Continued)

OTHER PUBLICATIONS

International Search Report dated Jul. 24, 2017.
(Continued)

*Primary Examiner* — Andrea Lindgren Baltzell
(74) *Attorney, Agent, or Firm* — Dinsmore & Shohl LLP; Yongsok Choi, Esq.

(57) ABSTRACT

The present invention relates to a microstrip-waveguide transition for transmission of electromagnetic wave signals. According to one aspect of the invention, there is provided a microstrip-waveguide transition for transmission of electromagnetic wave signals, comprising: a feeding part for providing an electromagnetic wave signal to be transmitted through the waveguide; and a ground part formed at a predetermined interval from the feeding part, wherein the microstrip and the waveguide are coupled alongside each other along a length direction of the waveguide, and wherein (Continued)

a distance between the feeding part and the ground part in a direction perpendicular to the length direction of the waveguide is greater as it is closer to the waveguide.

15 Claims, 10 Drawing Sheets

(51) Int. Cl.
| | |
|---|---|
| *H01P 3/16* | (2006.01) |
| *H01P 3/10* | (2006.01) |
| *H01P 3/12* | (2006.01) |
| *H01P 5/02* | (2006.01) |
| *H01P 3/08* | (2006.01) |
| *H01Q 13/06* | (2006.01) |
| *H04L 12/40* | (2006.01) |

(52) U.S. Cl.
CPC .............. *H01P 3/122* (2013.01); *H01P 3/16* (2013.01); *H01P 3/165* (2013.01); *H01P 5/02* (2013.01); *H01P 5/087* (2013.01); *H01Q 9/045* (2013.01); *H01Q 9/0407* (2013.01); *H01Q 13/06* (2013.01); *H04L 12/40052* (2013.01)

(58) Field of Classification Search
USPC .......................................................... 343/772
See application file for complete search history.

(56) References Cited

U.S. PATENT DOCUMENTS

| | | | |
|---|---|---|---|
| 4,216,449 A | 8/1980 | Kach | |
| 4,441,091 A | 4/1984 | Nishida et al. | |
| 5,109,232 A | 4/1992 | Monte | |
| 5,488,380 A | 1/1996 | Harvey et al. | |
| 6,417,742 B1 | 7/2002 | Enokuma | |
| 2002/0027481 A1 | 3/2002 | Fiedziuszko | |
| 2003/0122634 A1* | 7/2003 | Goff | H01P 5/107 333/26 |
| 2013/0256849 A1 | 10/2013 | Elad et al. | |
| 2014/0368301 A1* | 12/2014 | Herbsommer | H01P 3/16 333/239 |
| 2015/0295297 A1* | 10/2015 | Cook | H01P 11/001 333/239 |
| 2015/0295299 A1* | 10/2015 | Herbsommer | H01P 3/122 333/135 |
| 2017/0170539 A1* | 6/2017 | Morgan | H01P 3/127 |

FOREIGN PATENT DOCUMENTS

| | | |
|---|---|---|
| FR | 1190178 A | 10/1959 |
| JP | S5527717 A | 2/1980 |
| JP | 2002543449 A | 12/2002 |
| JP | 2005515677 A | 5/2005 |
| JP | 2007235630 A | 9/2007 |
| JP | 2008028523 A | 2/2008 |
| JP | 2015080100 A | 4/2015 |
| KR | 10-2001-0112034 A | 12/2001 |
| KR | 10-0846872 B1 | 7/2008 |

OTHER PUBLICATIONS

George E. Ponchak and Alan N. Downey, "A New Model for Broadband Waveguide to Microstrip Transition Design", NASA (National Aeronautics and Space Administration. Lewis Research Center, Cleveland, OH.), Technical Memorandum, Dec. 1986.

Andrey Mozharovskiy; Alexey Artemenko; Vladimir Ssorin; Roman Maslennikov and Alexey Sevastyanov, "Wideband Tapered Antipodal Fin-Line Waveguide to Microstrip Transition for E-band Applications", Publisher: IEEE, European Microwave Conference, Nuremberg, Germany, Oct. 6, 2013.

Sung Jing, et al., "Waveguide-to-Microstrip Antipodal Finline Transition at W Band," 2013 Third International Conference on Instrumentation, Measurement, Computer, Communication and Control, Shenyang, Sep. 2013, pp. 510-513.

Shaghik Atakaramians, et al., "Terahertz dielectric waveguides", Advances in Optics and Photonics, 2013 Optical Society of America, Jun. 27, 2013, vol. 5, No. 2, pp. 169-215.

Soon Hee Kim, et al., "A Study on the Propagation Characteristics of Circular Waveguide with N-Layer Dielectric", Korean Institute of Communications Science & Engineering, Kwangwoon University, 1986 Spring Conference, May 24, 1986.

* cited by examiner

MICROSTRIP-WAVEGUIDE TRANSITION FOR TRANSMITTING ELECTROMAGNETIC WAVE SIGNAL

CROSS REFERENCE TO RELATED APPLICATIONS

This application is a continuation of PCT/KR2017/003338 filed on Mar. 28, 2017 which claims priority to Korean Patent Application No. 10-2016-0037121 filed on Mar. 28, 2016, Korean Patent Application No. 10-2016-0037141 filed on Mar. 28, 2016, and Korean Patent Application No. 10-2017-0038747 filed on Mar. 27, 2017, the entire contents of which are herein incorporated by reference.

FIELD OF THE INVENTION

The present invention relates to a microstrip-waveguide transition for transmission of electromagnetic wave signals and a method therefor.

BACKGROUND

As data traffic is rapidly increased, data transmission/receipt speed of I/O bus connecting integrated circuits is also being quickly increased. For last decades, conductor-based interconnects (e.g., copper wires) with high cost and power efficiency have been widely applied to wired communication systems. However, such conductor-based interconnects have inherent limitations in channel bandwidths due to skin effect caused by electromagnetic induction.

Meanwhile, optic-based interconnects with high data transmission/reception speed have been introduced and widely used as an alternative to the conductor-based interconnects. However, the optic-based interconnects have limitations in that they cannot completely replace the conductor-based interconnects because the costs of installation and maintenance thereof are very high.

Recently, a new type of interconnect comprising a waveguide composed of a dielectric has been introduced. Since the new type of interconnect (so-called e-tube) has advantages of both of metal and dielectric, it has high cost and power efficiency and enables high-speed data communication within a short range. Thus, it has come into the spotlight as an interconnect employable in chip-to-chip communication.

In this regard, the inventor(s) present a technique for a transition with a novel structure to allow a microstrip (i.e., a microstrip circuit) and a waveguide to be coupled alongside each other.

SUMMARY OF THE INVENTION

One object of the present invention is to solve all the above-described problems.

Another object of the invention is to provide a transition with a novel structure to allow a microstrip and a waveguide to be coupled alongside each other, by providing a microstrip-waveguide transition, comprising a feeding part for providing an electromagnetic wave signal to be transmitted through the waveguide, and a ground part formed at a predetermined interval from the feeding part, wherein the microstrip and the waveguide are coupled alongside each other along a length direction of the waveguide, and wherein a distance between the feeding part and the ground part in a direction perpendicular to the length direction of the waveguide is greater as it is closer to the waveguide.

According to one aspect of the invention to achieve the objects as described above, there is provided a microstrip-waveguide transition for transmission of electromagnetic wave signals, comprising: a feeding part for providing an electromagnetic wave signal to be transmitted through the waveguide; and a ground part formed at a predetermined interval from the feeding part, wherein the microstrip and the waveguide are coupled alongside each other along a length direction of the waveguide, and wherein a distance between the feeding part and the ground part in a direction perpendicular to the length direction of the waveguide is greater as it is closer to the waveguide.

According to another aspect of the invention, there is provided a microstrip-waveguide transition for transmission of electromagnetic wave signals, comprising: a feeding part for providing an electromagnetic wave signal to be transmitted through the waveguide; a ground part formed at a predetermined interval from the feeding part; and a via part for electrically connecting the feeding part and the ground part along a height direction of the waveguide, wherein the microstrip and the waveguide are coupled alongside each other along a length direction of the waveguide.

According to yet another aspect of the invention, there is provided a microstrip-waveguide transition for transmission of electromagnetic wave signals, comprising: a first substrate; a second substrate disposed below the first substrate; a feeding part formed above the first substrate to provide an electromagnetic wave signal to be transmitted through the waveguide; an intermediate part formed between the first substrate and the second substrate; a ground part formed below the second substrate; a first via part formed through at least a part of the first substrate and the second substrate along a height direction of the waveguide to electrically connect the feeding part and the intermediate part; and a second via part formed through the second substrate along the height direction of the waveguide to electrically connect the intermediate part and the ground part, wherein the microstrip and the waveguide are coupled alongside each other along a length direction of the waveguide.

According to still another aspect of the invention, there is provided a method for transmission of electromagnetic wave signals, comprising the steps of: generating an electromagnetic wave signal; and propagating the generated electromagnetic wave signal along a feeding part to radiate an electromagnetic wave that forms an electric field in a direction parallel to or substantially parallel to a direction perpendicular to a length direction of a waveguide, wherein a microstrip and the waveguide are coupled alongside each other along the length direction of the waveguide.

In addition, there are further provided other microstrip-waveguide transitions and methods to implement the invention.

According to the invention, there may be provided a transition with a novel structure to allow a microstrip and a waveguide to be coupled alongside each other, thereby enhancing space efficiency of the microstrip and the waveguide and adaptability in an actual use environment.

According to the invention, there may be provided a microstrip-waveguide transition capable of variously radiating an electromagnetic wave that forms an electric field in a direction parallel to or substantially parallel to a width or length direction of the waveguide, thereby accommodating to various use environments and waveguides of various shapes.

According to the invention, a bandwidth of a signal transmission channel may be increased and a channel loss may be reduced.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of a Chip-To-Chip Interface Apparatus

Figure 1:
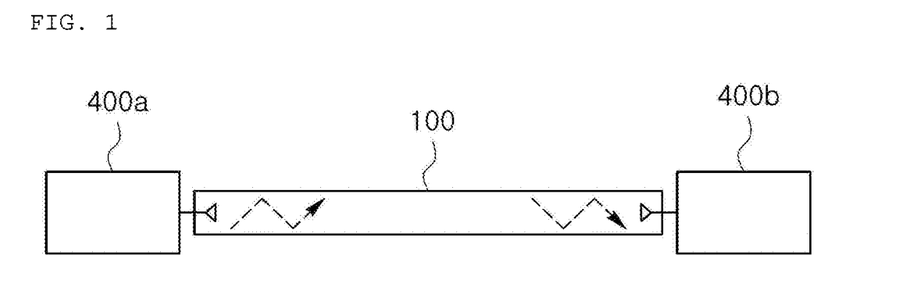
FIG. 1 conceptually shows the configuration of a chip-to-chip interface apparatus interconnected with a two-port network according to one embodiment of the invention.

FIG. 1 conceptually shows the configuration of a chip-to-chip interface apparatus interconnected with a two-port network according to one embodiment of the invention.

Referring to FIG. 1, a chip-to-chip interface apparatus according to one embodiment of the invention may comprise: a waveguide 100, which is an interconnect means for transmission of electromagnetic wave signals (e.g., data communication) between two chips (not shown) each present in two physically separated boards (not shown) or present in a single board (not shown); and microstrips 400a, 400b, which are means for delivering the signals from the two chips to the waveguide 100 or vice versa. It should be understood that the chips described herein do not only represent electronic circuit components in a traditional sense, each comprising a number of semiconductors such as transistors or the like, but also encompass, in their broadest sense, all types of components or elements that can exchange electromagnetic wave signals with each other.

According to one embodiment of the invention, a signal generated from the first chip may be propagated along a probe of the first microstrip 400a, and may be transmitted to the second chip through the waveguide 100 as it is transited at an impedance discontinuity surface between the first microstrip 400a and the waveguide 100.

Further, according to one embodiment of the invention, a signal transmitted through the waveguide 100 may be transmitted to the second chip through the second microstrip 400b as it is transited at an impedance discontinuity surface between the waveguide 100 and the second microstrip 400b.

Configuration of the Waveguide

Hereinafter, the internal configuration of the waveguide 100 crucial for implementing the present invention and the functions of the respective components thereof will be discussed.

Figure 2A:
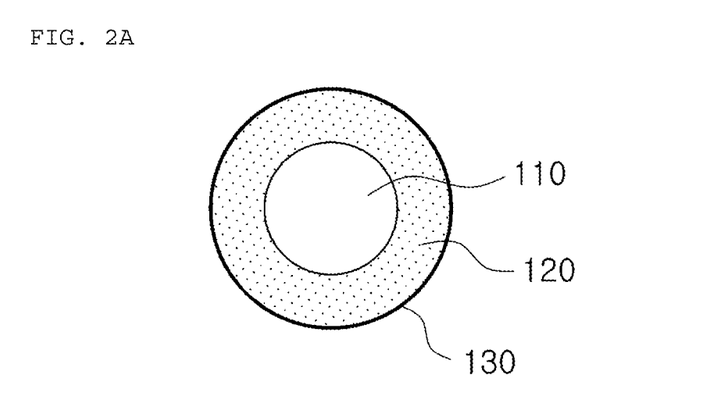
FIG. 2A illustratively shows the configuration of a waveguide according to one embodiment of the invention.
Figure 2B:
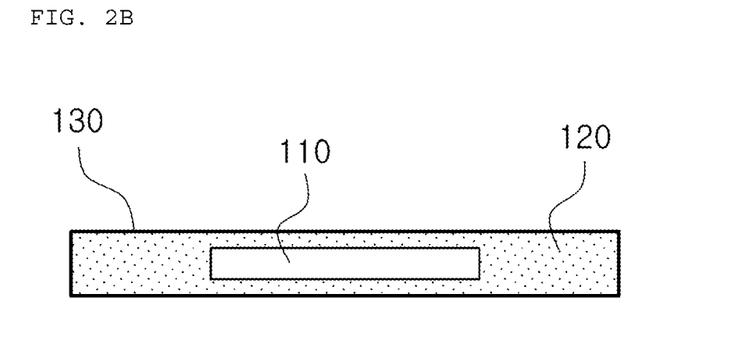
FIG. 2B illustratively shows the configuration of a waveguide according to one embodiment of the invention.

FIGS. 2A and 2B illustratively show the configuration of a waveguide according to one embodiment of the invention.

Referring to FIGS. 2A and 2B, the waveguide 100 according to one embodiment of the invention may comprise a dielectric part comprising two or more dielectrics 110, 120 having different permittivity, and a conductor part 130 surrounding at least a part of the dielectric part.

Specifically, according to one embodiment of the invention, the two or more dielectrics included in the dielectric part may comprise a first dielectric 110 and a second dielectric 120, and the second dielectric 120 may be formed to surround at least a part of the first dielectric 110. For example, the second dielectric 120 may surround all or a part of the first dielectric 110.

Here, according to one embodiment of the invention, the permittivity of the first dielectric 110 may be greater or less than that of the second dielectric 120. More specifically, according to one embodiment of the invention, the first dielectric 110 and the second dielectric 120 having different permittivity may be used to drastically reduce the degree of change in a group delay occurring according to a frequency change in a signal transmission channel via the waveguide 100.

For example, the first dielectric 110 may consist of teflon having a dielectric constant of about 2.0, and the second dielectric 120 may consist of polyethylene having a dielectric constant of about 1.2. Further, as another example, the first dielectric 110 may consist of air having a dielectric constant of about 1.0, and the second dielectric 120 may consist of teflon having a dielectric constant of about 2.0. Conversely, the first dielectric 110 may consist of teflon and the second dielectric 120 may consist of air.

Therefore, according to one embodiment of the invention, a signal transmitted through the waveguide 100 (i.e., an electromagnetic wave) may be guided along a boundary between the first dielectric 110 and the second dielectric 120 having different permittivity, or along a boundary between the first dielectric 110 or the second dielectric 120 and the conductor part 130.

Meanwhile, according to one embodiment of the invention, the conductor part 130 may consist of a material having electrical conductivity. For example, the conductor part 130 according to one embodiment of the invention may consist of a metallic material such as copper (Cu) which is traditionally in wide use, or may consist of a non-metallic material such as graphene.

First, referring to FIG. 2A, the first dielectric 110 may be in the form or a circular core, and the second dielectric 120 and the conductor part 130 may be in the form of an annular cladding, as seen from a cross-section cut along a direction perpendicular to a length direction of the waveguide 100. Further, according to one embodiment of the invention, the central axis of the dielectric part (more specifically, those of the first dielectric 110 and the second dielectric 120) may coincide with that of the conductor part 130.

Next, referring to FIG. 2B, the first dielectric 110 may be in the form or a rectangular core elongated in a horizontal or vertical direction, and the second dielectric 120 and the conductor part 130 may be in the form of a rectangular cladding surrounding the first dielectric 110, as seen from a cross-section cut along a direction perpendicular to the length direction of the waveguide 100. Further, according to one embodiment of the invention, the central axis of the dielectric part (more specifically, those of the first dielectric 110 and the second dielectric 120) may coincide with that of the conductor part 130.

Although not shown in the drawings, according to one embodiment of the invention, two or more waveguides 100 (i.e., the two or more waveguides 100 each comprising the first dielectric 110, the second dielectric 120, and the conductor part 130) may be coupled in a predetermined arrangement to form a bundle, and the two or more waveguides 100 included in the bundle may function to transmit signals through different signal transmission channels, respectively.

However, it is noted that the internal configuration or shape of the waveguide 100 according to the invention is not necessarily limited to those mentioned above, and may be changed without limitation as long as the objects of the invention can be achieved.

Configuration of a Microstrip-Waveguide Transition

Hereinafter, the internal configuration of a microstrip-waveguide transition 200 crucial for implementing the present invention and the functions of the respective components thereof will be discussed.

First Embodiment

According to a first embodiment of the invention, a microstrip-waveguide transition for transmission of electromagnetic wave signals may comprise a feeding part for providing an electromagnetic wave signal to be transmitted through the waveguide, and a ground part formed at a predetermined interval from the feeding part. For example, the feeding part and the ground part according to the first embodiment of the invention may be in the form of a wire. As another example, the feeding part and the ground part according to the first embodiment of the invention may be in the form of a plate. However, it is noted that the shape of the feeding part and the ground part according to the first embodiment of the invention is not necessarily limited to those mentioned above, and may be changed without limitation as long as the objects of the invention can be achieved.

Here, according to the first embodiment of the invention, the microstrip and the waveguide are coupled alongside each other along a length direction of the waveguide. For example, the microstrip and the waveguide according to the first embodiment of the invention may be coupled parallel to each other along the length direction of the waveguide, thereby enhancing signal transmission efficiency. As another example, the microstrip and the waveguide according to the first embodiment of the invention may be coupled alongside each other as they are tilted at a predetermined angle (e.g., an angle included in the range of 0 to 45 degrees) with respect to a parallel axis along the length direction of the waveguide, thereby satisfying the characteristics of the microstrip or the waveguide, or the physical constraints required for the microstrip-waveguide transition.

Further, according to the first embodiment of the invention, a distance between the feeding part and the ground part in a direction perpendicular to the length direction of the waveguide is greater as it is closer to the waveguide. Specifically, according to the first embodiment of the invention, a distance between the feeding part and the ground part in a width direction of the waveguide is greater as it is closer to the waveguide.

Therefore, according to the first embodiment of the invention, an electromagnetic wave that forms an electric field in a direction parallel to or substantially parallel to the width direction of the waveguide may be radiated as an electromagnetic wave signal is propagated along the feeding part.

Further, according to the first embodiment of the invention, the cross-section of the waveguide may have a shape longer in a height direction of the waveguide than in a width direction thereof. Such a shape may be suitable for radiating an electromagnetic wave that forms an electric field in a direction parallel to or substantially parallel to the width direction of the waveguide.

FIGS. 3 to 6 illustratively show the configuration of a microstrip-waveguide transition according to the first embodiment of the invention.

First, referring to FIGS. 3, 4A and 4B, a microstrip-waveguide transition 200 according to the first embodiment of the invention may comprise a substrate 210, and a feeding part 220 for providing an electromagnetic wave signal may be formed above the substrate 210 and a ground part 230 may be formed below the substrate 210.

Here, according to the first embodiment of the invention, the microstrip and the waveguide 100 may be coupled alongside each other along a length direction of the waveguide 100. Here, according to the first embodiment of the invention, the substrate 210 may consist of a dielectric. Further, according to the first embodiment of the invention, the feeding part 220 and the ground part 230 may consist of an electrically conductive material.

Figure 3:
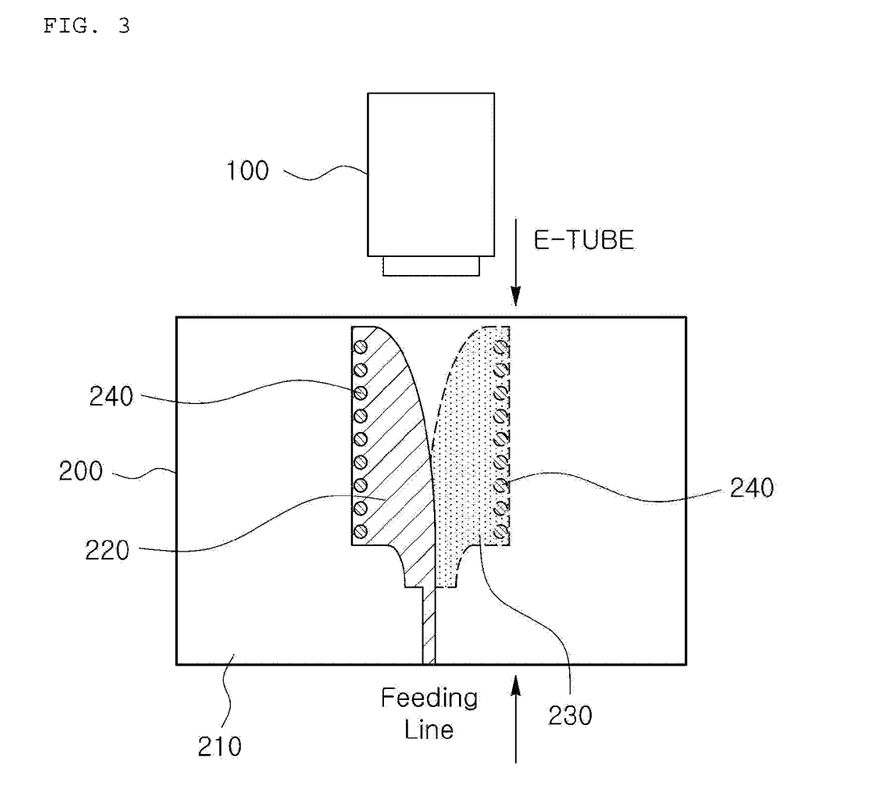
FIG. 3 illustratively shows the configuration of a microstrip-waveguide transition according to a first embodiment of the invention.
Figure 4A:
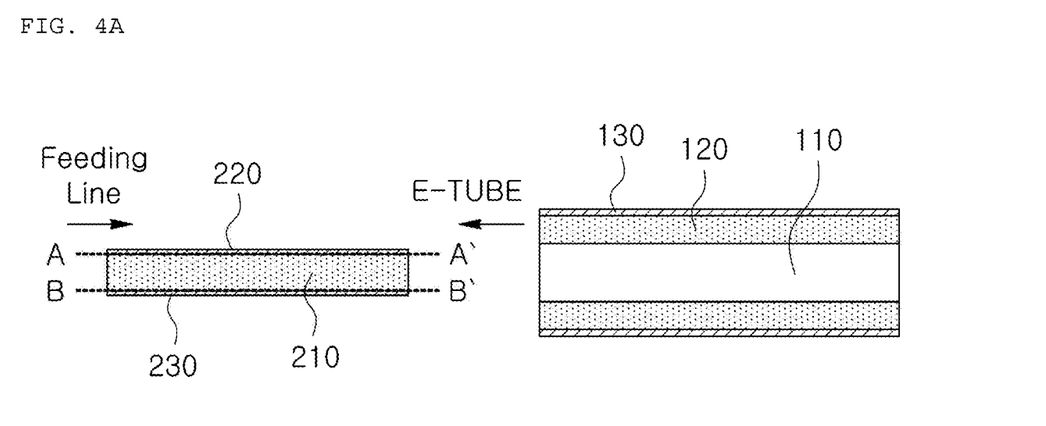
FIG. 4A illustratively shows the configuration of a microstrip-waveguide transition according to a first embodiment of the invention.
Figure 4B:
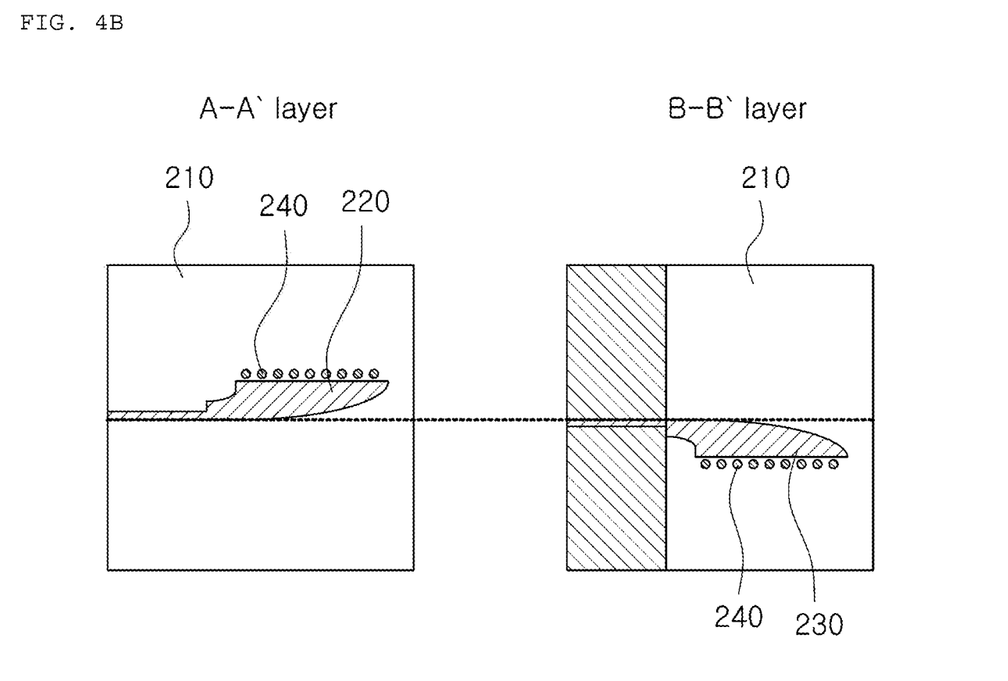
FIG. 4B illustratively shows the configuration of a microstrip-waveguide transition according to a first embodiment of the invention.

Referring further to FIGS. 3, 4A and 4B, the microstrip-waveguide transition 200 according to the first embodiment of the invention may further comprise a via array part 240 comprising at least one via formed through at least a part of the substrate along a thickness direction of the substrate 210 and arranged along a length direction of the feeding part 220 or the ground part 230.

Referring further to FIGS. 3, 4A and 4B, the microstrip-waveguide transition 200 according to the first embodiment of the invention may have a two-layer structure in which the feeding part 220 and the ground part 230 are correspondingly formed on an upper layer (i.e., the layer A-A' in FIGS. 4A and 4B) and a lower layer (i.e., the layer B-B' in FIGS. 4A and 4B) of the substrate 210, respectively, with the substrate 210 being interposed therebetween.

Specifically, referring to FIGS. 3, 4A and 4B, in the microstrip-waveguide transition 200 according to the first embodiment of the invention, the feeding part 220 and the ground part 230 may have a fin shape in which a distance therebetween in a width direction of the waveguide 100 is greater as it is closer to the waveguide 100 (which is known as a fin-line transition structure). Therefore, according to the first embodiment of the invention, impedance matching may be made between the microstrip-waveguide transition 200 and the waveguide 100 as an input electromagnetic wave signal is propagated along the feeding part 220. Further details of the transition will be described later with reference to FIGS. 5A to 5C.

Referring further to FIGS. 3, 4A and 4B, the at least one via included in the via array part 240 of the microstrip-waveguide transition 200 according to the first embodiment of the invention may be arranged along a length direction of the feeding part 220 and the ground part 230. The via array part 240 may function to confine the electromagnetic wave signal propagated through the feeding part 220 such that it may not escape outwardly.

Figure 5A:
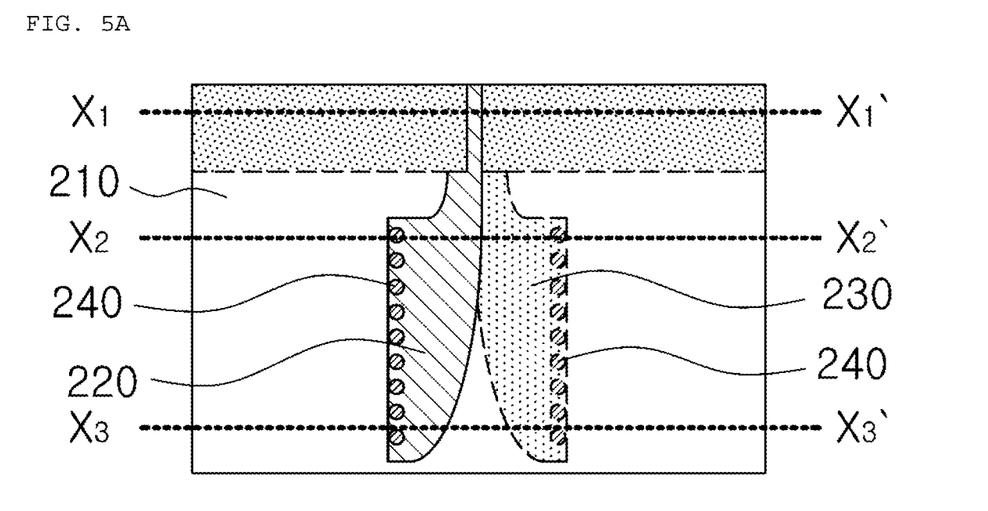
FIG. 5A illustratively shows the configuration of a microstrip-waveguide transition according to a first embodiment of the invention.
Figure 5B:
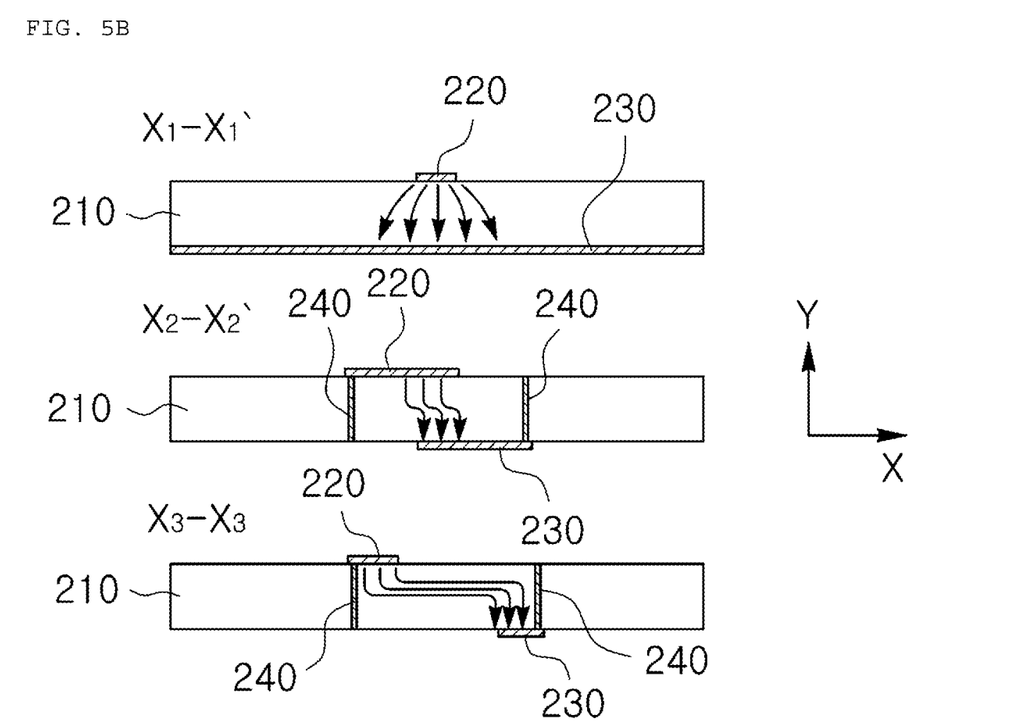
FIG. 5B illustratively shows the configuration of a microstrip-waveguide transition according to a first embodiment of the invention.
Figure 5C:
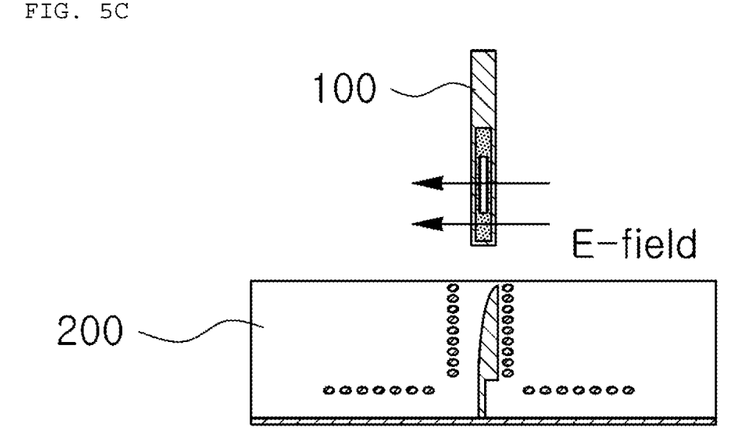
FIG. 5C illustratively shows the configuration of a microstrip-waveguide transition according to a first embodiment of the invention.

Next, referring to FIGS. 5A to 5C, in a section $X_1$-$X_1'$ of the microstrip-waveguide transition 200 according to the first embodiment of the invention, which is relatively far from the waveguide 100, the feeding part 220 and the ground part 230 are disposed in a direction perpendicular to the substrate 210 or in a height direction of the waveguide 100 (i.e., a direction (substantially) parallel to the Y-axis of FIG. 5B), so that an electromagnetic wave signal propagated through the feeding part 220 may form an electric field in the direction perpendicular to the substrate 210 or in the height direction of the waveguide 100 (i.e., the direction (substantially) parallel to the Y-axis of FIG. 5B).

Referring further to FIGS. 5A to 5C, the feeding part 220 and the ground part 230 of the microstrip-waveguide transition 200 according to the first embodiment of the invention have a fin shape, and thus, in a section $X_2$-$X_2'$ which is relatively close to the waveguide 100, an electromagnetic wave signal propagated through the feeding part 220 may form an electric field in an oblique direction with respect to the substrate 210, as the feeding part 220 and the ground part 230 are slightly distanced from each other in a width direction of the waveguide 100.

Referring further to FIGS. 5A to 5C, in a section $X_3$-$X_3'$ which is closest to the waveguide 100, the feeding part 220 and the ground part 230 are disposed far apart from each other in a direction parallel to the substrate 210 or in a width direction of the waveguide 100 (i.e., a direction (substantially) parallel to the X-axis of FIG. 5B), so that an electromagnetic wave signal propagated through the feeding part 220 may form an electric field in the direction parallel to the substrate 210 or in the width direction of the waveguide 100 (i.e., the direction (substantially) parallel to the X-axis of FIG. 5B).

That is, according to the first embodiment of the invention, an electromagnetic wave signal inputted from a chip (not shown) and propagated along the feeding part 220 in a transverse electromagnetic (TEM) mode may be polarized and radiated to the waveguide 100 in the width direction of the waveguide 100 (i.e., the direction (substantially) parallel to the X-axis of FIG. 5B), wherein the waveguide 100 and the microstrip are coupled alongside each other along a length direction of the waveguide 100. The radiated electromagnetic wave signal may be transited as an electromagnetic wave signal propagated along the waveguide 100 in a transverse electric (TE) mode.

Meanwhile, as shown in FIG. 5C, according to the first embodiment of the invention, the microstrip may preferably be coupled to the waveguide 100 having a shape suitable for forming an electric field in a direction (substantially) parallel to the width direction of the waveguide 100, in consideration of the efficiency of electromagnetic wave signal transmission. For example, according to the first embodiment of the invention, the cross-section of the waveguide 100 coupled to the microstrip may have a shape longer in the height direction of the waveguide 100 than in the width direction thereof.

Meanwhile, according to the first embodiment of the invention, gradual impedance matching is enabled using the feeding part 220 and the ground part 230 having a fin shape.

Figure 6:
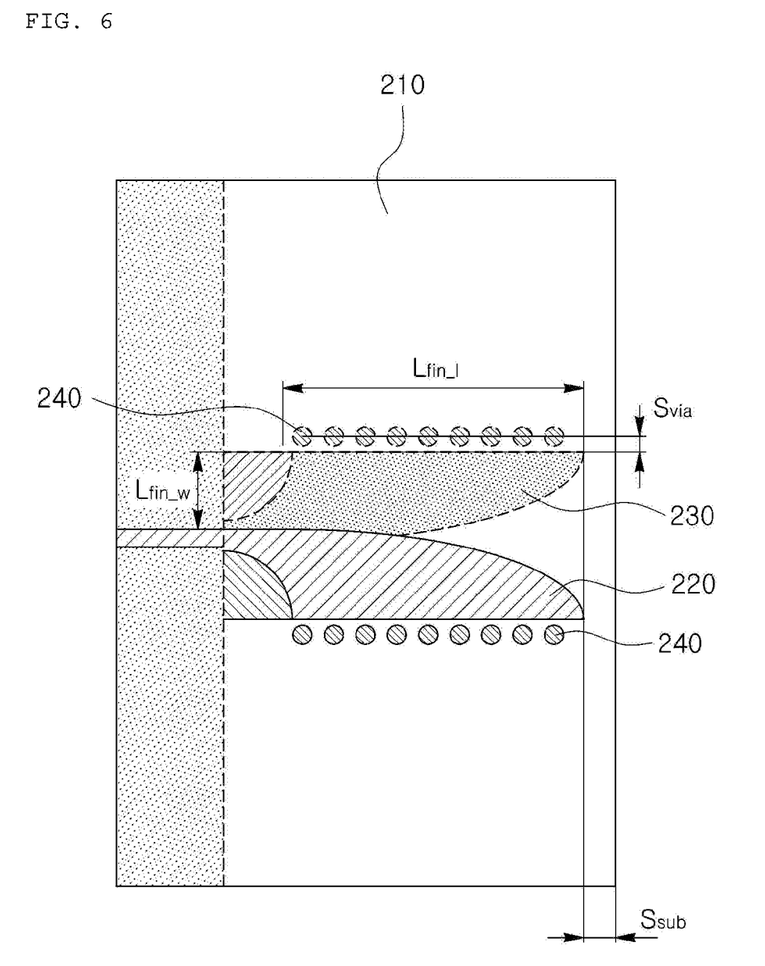
FIG. 6 illustratively shows the configuration of a microstrip-waveguide transition according to a first embodiment of the invention.

Specifically, referring to FIG. 6, in the microstrip-waveguide transition 200 according to the first embodiment of the invention, impedances of the feeding part 220 and the ground part 230 having a fin shape may be adjusted by $L_{fin\_l}$ and $L_{fin\_w}$.

Referring further to FIG. 6, in the microstrip-waveguide transition 200 according to the first embodiment of the invention, $S_{sub}$ represents a distance between the microstrip and the waveguide in the length direction. $S_{sub}$ should be greater than zero because it is actually difficult to form the feeding part 220 up to the tip of the substrate 210. The part corresponding to $S_{sub}$ may serve as another waveguide (i.e., a waveguide in the substrate 210) and has a predetermined impedance value. Therefore, according to the first embodiment of the invention, impedance matching between the microstrip and the waveguide 100 may be performed by appropriately adjusting $S_{sub}$.

Referring further to FIG. 6, in the microstrip-waveguide transition 200 according to the first embodiment of the invention, $S_{via}$ represents a distance between the feeding part 220 or the ground part 230 and the via array part 240, which is arranged along a length direction of the feeding part 220 or the ground part 230. $S_{via}$ may have a positive value (when the via array part 240 is formed outside the feeding part 220 or the ground part 230) or a negative value (when the via array part 240 is formed inside the feeding part 220 or the ground part 230). Here, according to the first embodiment of the invention, a resonance frequency generated in the transition may be reduced when $S_{via}$ has a positive value, and may be increased when $S_{via}$ has a negative value.

Referring further to FIG. 6, a fan-shaped section at least partially surrounded by the feeding part 220 or the ground part 230 represents a section where no electrically conductive material is formed on the substrate 210 of the microstrip-waveguide transition 200 according to the first embodiment of the invention. (The shape of the section is not necessarily limited to a fan, and may be a polygon or the like.) By appropriately adjusting the length of the arc of the section, the characteristics of an electromagnetic wave signal transmission channel may be changed as desired. For example, radiation occurring at each section of the transition structure between the microstrip-waveguide transition 200 and the waveguide 100 may result in frequency-dependent channel characteristics, and the shape and size of the fan-shaped section in FIG. 6 may be adjusted to derive the frequency-dependent channel characteristics desired by a designer.

Although the microstrip-waveguide transition shown in FIGS. 3 to 6 has been mainly described above, the above description is illustrative. It is noted that the configuration of the microstrip-waveguide transition according to the first embodiment of the invention is not necessarily limited to those shown in FIGS. 3 to 6, and may be changed without limitation as long as the objects of the invention can be achieved.

Second Embodiment

Meanwhile, according to a second embodiment of the invention, a microstrip-waveguide transition for transmission of electromagnetic wave signals may comprise a feeding part for providing an electromagnetic wave signal to be transmitted through the waveguide 100, a ground part formed at a predetermined interval from the feeding part, and a via part for electrically connecting the feeding part and the ground part along a height direction of the waveguide 100.

Here, according to the second embodiment of the invention, the microstrip and the waveguide 100 may be coupled parallel to each other along a length direction of the waveguide 100. For example, the microstrip and the waveguide according to the second embodiment of the invention may be coupled parallel to each other along the length direction of the waveguide, thereby enhancing signal transmission efficiency. As another example, the microstrip and the waveguide according to the second embodiment of the invention may be coupled alongside each other as they are tilted at a predetermined angle (e.g., an angle included in the range of 0 to 45 degrees) with respect to a parallel axis along the length direction of the waveguide, thereby satisfying the characteristics of the microstrip or the waveguide, or the physical constraints required for the microstrip-waveguide transition.

Therefore, according to the second embodiment of the invention, an electromagnetic wave that forms an electric field in a direction parallel to or substantially parallel to the height direction of the waveguide 100 may be radiated as an electromagnetic wave signal is sequentially propagated along the feeding part, the via part, and the ground part.

Further, according to the second embodiment of the invention, the cross-section of the waveguide 100 may have a shape longer in a width direction of the waveguide 100 than in the height direction thereof. Such a shape may be suitable for radiating an electromagnetic wave that forms an electric field in a direction parallel to or substantially parallel to the height direction of the waveguide 100.

Meanwhile, FIGS. 7 to 10C illustratively show the configuration of a microstrip-waveguide transition 300 according to the second embodiment of the invention.

FIGS. 7 to 10C illustratively show the configuration of the microstrip according to the second embodiment of the invention.

First, referring to FIGS. 7, 8A and 8B, a microstrip-waveguide transition 300 according to the second embodiment of the invention may comprise a first substrate 310; a second substrate 320 disposed below the first substrate 310; a feeding part 330 formed above the first substrate 310; an intermediate part 340 formed between the first substrate 310 and the second substrate 320; a ground part 350 formed below the second substrate 320; a first via part 360 formed through at least a part of the first substrate 310 and the second substrate 320 along a height direction of the waveguide 100 to electrically connect the feeding part 330 and the intermediate part 340; and a second via part 370 formed through the second substrate 320 along the height direction of the waveguide 100 to electrically connect the intermediate part 340 and the ground part 350.

Here, according to the second embodiment of the invention, the microstrip and the waveguide 100 may be coupled alongside each other along a length direction of the waveguide 100. Here, according to the second embodiment of the invention, the first substrate 310 and the second substrate 320 may consist of a dielectric. Further, according to the second embodiment of the invention, the feeding part 330, the intermediate part 340, the ground part 350, the first via part 360, and the second via part 370 may all consist of an electrically conductive material.

Figure 7:
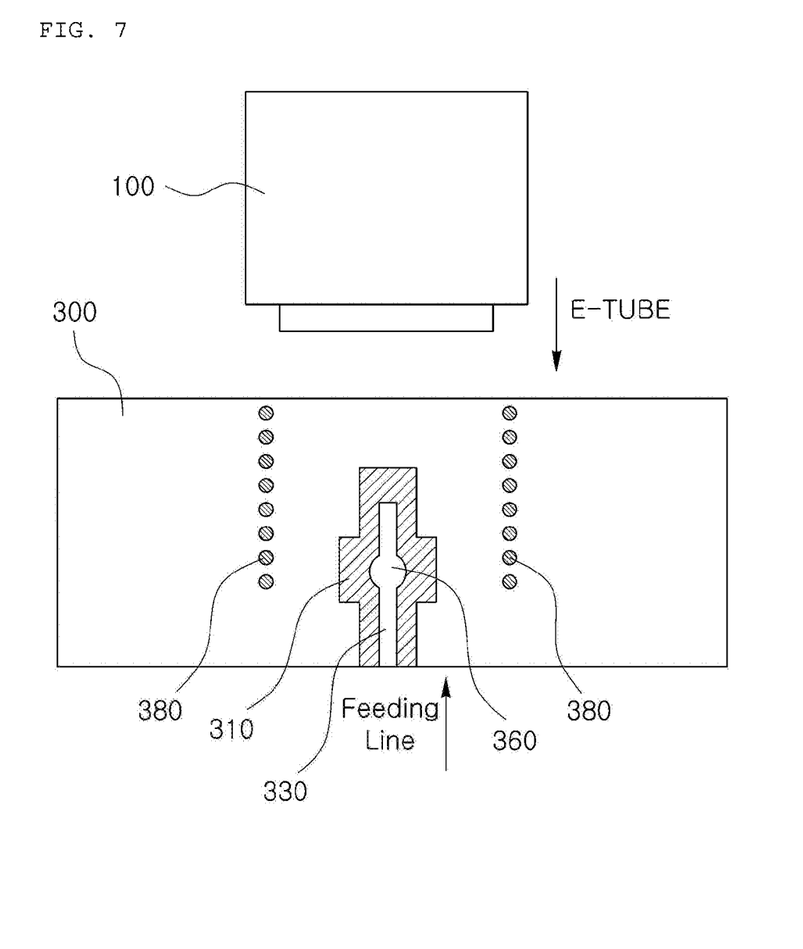
FIG. 7 illustratively shows the configuration of a microstrip-waveguide transition according to a second embodiment of the invention.
Figure 8A:
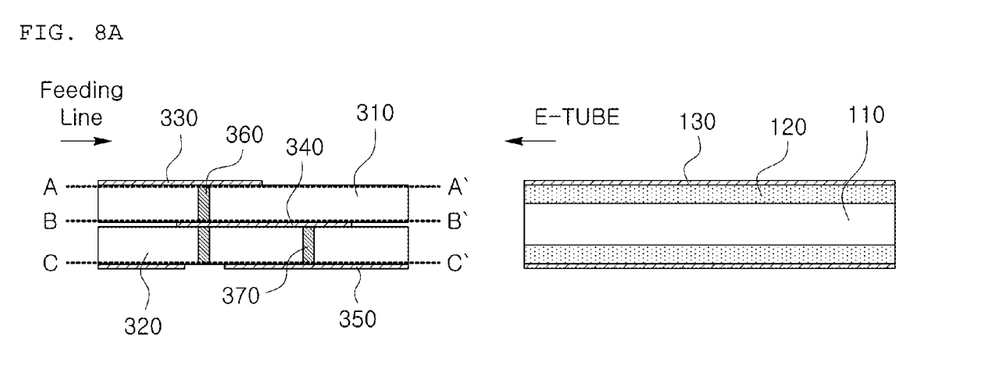
FIG. 8A illustratively shows the configuration of a microstrip-waveguide transition according to a second embodiment of the invention.
Figure 8B:
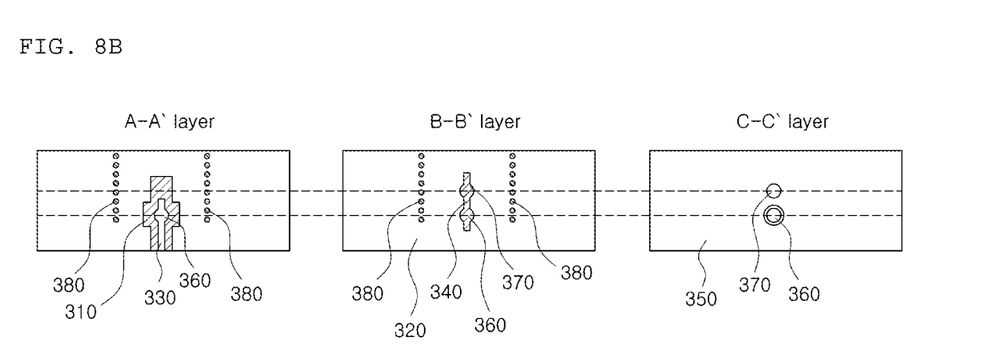
FIG. 8B illustratively shows the configuration of a microstrip-waveguide transition according to a second embodiment of the invention.

Referring further to FIGS. 7, 8A and 8B, the microstrip-waveguide transition 300 according to the second embodiment of the invention may further comprise a via array part 380 comprising at least one auxiliary via formed through at least a part of the first substrate 310 and the second substrate 320 along a thickness direction of the first substrate 310 and the second substrate 320 and arranged along a length direction of the feeding part 330, the intermediate part 340, and the ground part 350.

Referring further to FIGS. 7, 8A and 8B, the microstrip-waveguide transition 300 according to the first embodiment of the invention may have a three-layer structure in which the feeding part 330, the intermediate part 340, and the ground part 350 are formed on an upper layer of the first substrate 310 (i.e., the layer A-A' in FIGS. 8A and 8B), a layer between the first substrate 310 and the second substrate 320 (i.e., the layer B-B' in FIGS. 8A and 8B), and a lower layer of the second substrate 320 (i.e., the layer C-C' in FIGS. 8A and 8B), respectively.

Referring further to FIGS. 7, 8A and 8B, the first via part 360 and the second via part 370 of the microstrip-waveguide transition 300 according to the second embodiment of the invention may be sequentially disposed such that they approach the waveguide along the length direction of the feeding part 330, the intermediate part 340, and the ground part 350 (which is known as a double-via-probe transition structure). That is, according to the second embodiment of the invention, a distance from the waveguide 100 to the first via part 360 may be greater than that from the waveguide 100 to the second via part 370, wherein the waveguide 100 and the microstrip are coupled alongside each other along the length direction of the waveguide 100. Therefore, according to the second embodiment of the invention, impedance matching may be made between the microstrip and the waveguide 100 as an input electromagnetic wave signal is sequentially propagated along the feeding part 330, the first via part 360, the intermediate part 340, the second via part 370, and the ground part 350.

Referring further to FIGS. 7, 8A and 8B, the at least one auxiliary via included in the via array part 380 of the microstrip-waveguide transition 300 according to the second embodiment of the invention may be arranged along the length direction of the feeding part 330, the intermediate part 340, and the ground part 350. The via array part 380 may function to confine the electromagnetic wave signal sequentially propagated through the feeding part 330, the first via part 360, the intermediate part 340, the second via part 370, and the ground part 350 such that it may not escape outwardly from the first substrate 310 and the second substrate 320.

Figure 9A:
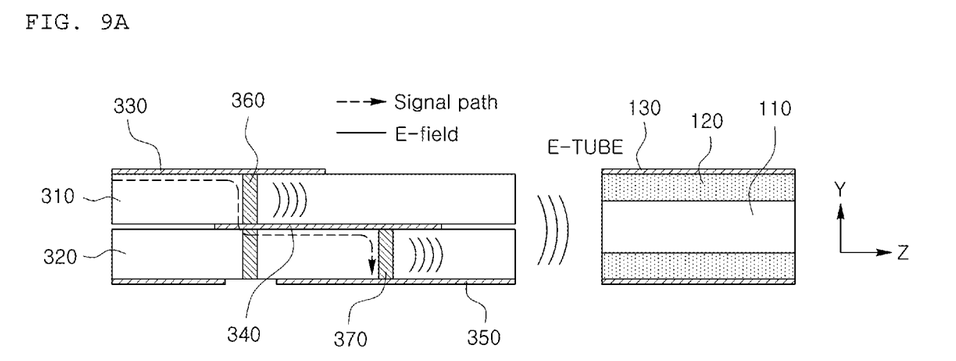
FIG. 9A illustratively shows the configuration of a microstrip-waveguide transition according to a second embodiment of the invention.
Figure 9B:
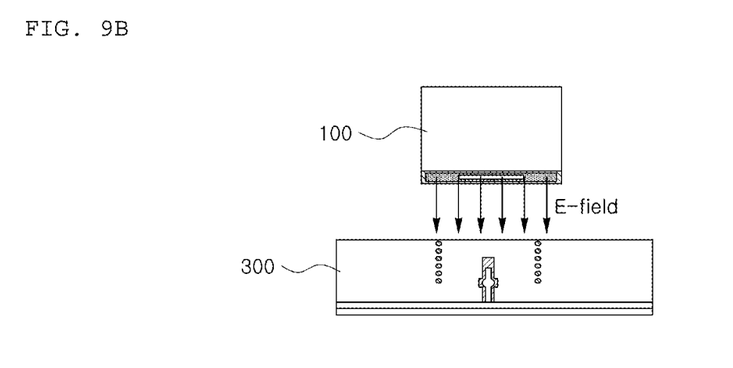
FIG. 9B illustratively shows the configuration of a microstrip-waveguide transition according to a second embodiment of the invention.

Next, referring to FIGS. 9A and 9B, in the microstrip-waveguide transition 300 according to the second embodiment of the invention, an electromagnetic wave signal inputted from a chip (not shown) may be propagated sequentially passing through the first via part 360 and the second via part 370. Here, the electromagnetic wave signal passing through the first via part 360 and the second via part 370 may form an electric field in a direction perpendicular to the first substrate 310 and the second substrate 320 or in a height direction of the waveguide 100 (i.e., a direction (substantially) parallel to the Y-axis of FIG. 9A).

That is, according to the second embodiment of the invention, an electromagnetic wave signal inputted from a chip (not shown) and propagated along the feeding part 330 in a TEM mode may be polarized and radiated to the waveguide 100, which is coupled to the microstrip, in a direction (substantially) parallel to the Y-axis of FIG. 9B. The radiated electromagnetic wave signal may be transited as an electromagnetic wave signal propagated along the waveguide 100 in a TE mode.

As shown in FIG. 9B, the microstrip-waveguide transition 300 according to the second embodiment of the invention may preferably be coupled to the waveguide having a shape suitable for forming an electric field in a direction (substantially) parallel to the height direction of the waveguide 100, in consideration of the efficiency of electromagnetic wave signal transmission. For example, according to the second embodiment of the invention, the cross-section of the waveguide 100 coupled to the microstrip may have a shape longer in a width direction of the waveguide 100 than in the height direction thereof. Therefore, the microstrip-waveguide transition 300 according to the second embodiment of the invention may be suitably applied to an environment with strict requirements for vertical thickness.

Meanwhile, according to the second embodiment of the invention, an electromagnetic wave radiated by an electromagnetic wave signal passing through the first via part 360 and the second via part 370, which are sequentially disposed along the length direction of the feeding part 330, the intermediate part 340, and the ground part 350, may be propagated through an area defined by the via array part 380 of the first substrate 310 and the second substrate 320 (i.e., through another waveguide in the substrates 310, 320), and transited to the waveguide 100.

Figure 10A:
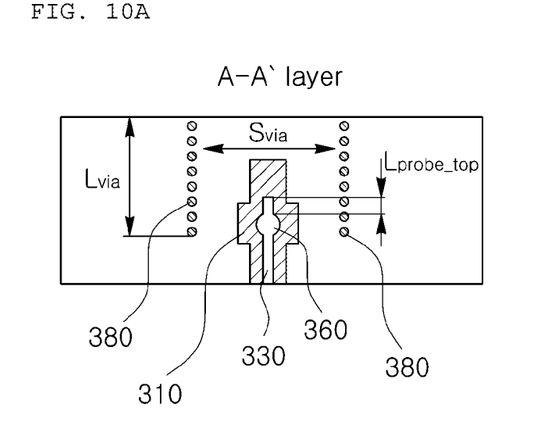
FIG. 10A illustratively shows the configuration of a microstrip-waveguide transition according to a second embodiment of the invention.
Figure 10B:
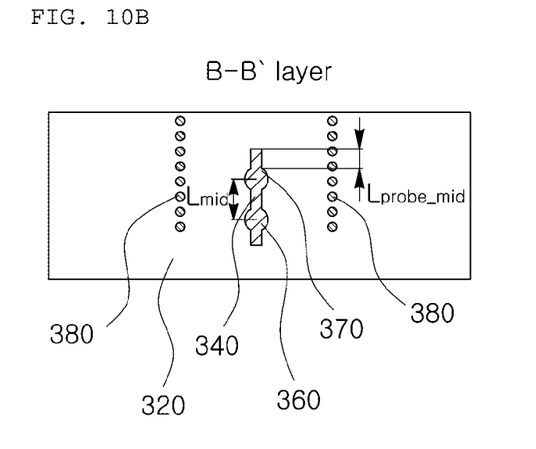
FIG. 10B illustratively shows the configuration of a microstrip-waveguide transition according to a second embodiment of the invention.
Figure 10C:
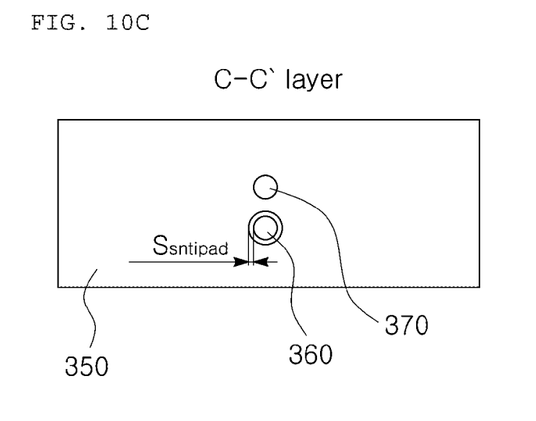
FIG. 10C illustratively shows the configuration of a microstrip-waveguide transition according to a second embodiment of the invention.

Specifically, referring to FIGS. 10A to 10C, in the microstrip-waveguide transition 300 according to the second embodiment of the invention, the area defined by the via array part 380 of the first substrate 310 and the second substrate 320 may serve as a waveguide. Thus, $S_{via}$ may be a width of the waveguide in the substrates 310, 320, and a cutoff frequency may be lower as $S_{via}$ is greater. Further, in the microstrip-waveguide transition 300 according to the second embodiment of the invention, $L_{via}$ may be a length of the waveguide in the substrates 310, 320, and it is possible to minimize electromagnetic wave reflection that may occur at an impedance discontinuity surface between the microstrip-waveguide transition 300 and the waveguide 100, by appropriately adjusting the value of $L_{via}$.

Referring further to FIGS. 10A to 10C, in the microstrip-waveguide transition 300 according to the second embodiment of the invention, it is possible to increase a bandwidth of the transition by appropriately adjusting a length of the probe extending from the feeding part 330 (i.e., $L_{probe\_top}$) and a length of the probe extending from the intermediate part 340 (i.e., $L_{probe\_mid}$).

Referring further to FIGS. 10A to 10C, in the microstrip-waveguide transition 300 according to the second embodiment of the invention, interference between an electric field of an electromagnetic wave radiated from the first via part 360 and that of an electromagnetic wave radiated from the second via part 370 is determined by a distance between the first via part 360 and the second via part 370 (i.e., $L_{mid}$). Thus, the bandwidth of the transition may be controlled by appropriately adjusting the value of $L_{mid}$ based on the wavelength of the frequency of an electromagnetic wave signal of interest.

Although the microstrip-waveguide transition shown in FIGS. 7 to 10C has been mainly described above, the above description is illustrative. It is noted that the configuration of the microstrip-waveguide transition according to the second embodiment of the invention is not necessarily limited to those shown in FIGS. 7 to 10C, and may be changed without limitation as long as the objects of the invention can be achieved.

Although details or parameters for the components included in the microstrip and the waveguide according to the invention have been described above in detail, it is noted that the configuration of the microstrip and the waveguide according to the invention is not necessarily limited to those mentioned above, and may be changed without limitation as long as the objects or effects of the invention can be achieved.

In particular, although it has been mainly described above that the waveguide whose cross-section has a rectangular shape is employed in the microstrip-waveguide transition, it is noted that the shape of the waveguide according to the invention is not necessarily limited to those mentioned above, and the waveguides having various shapes, including those described in the "Configuration of the waveguide" section, may be employed as long as the objects of the invention can be achieved.

Electromagnetic Wave Signal Transmission System

Meanwhile, according to one embodiment of the invention, a system for transmitting an electromagnetic wave signal using the microstrip-waveguide transition according to the first or second embodiment of the invention may perform the operations to be described below. For example, the electromagnetic wave signal transmission system according to one embodiment of the invention may be implemented with a known microprocessor.

First, according to one embodiment of the invention, the electromagnetic wave signal transmission system may generate an electromagnetic wave signal to be transmitted through the microstrip-waveguide transition 200, 300.

Next, according to one embodiment of the invention, the electromagnetic wave signal transmission system may propagate the generated electromagnetic wave signal along the feeding part of the microstrip-waveguide transition 200, 300 to radiate an electromagnetic wave that forms an electric field in a direction parallel to or substantially parallel to a direction perpendicular to a length direction of the waveguide 100.

Here, according to one embodiment of the invention, the microstrip and the waveguide may be coupled alongside each other along the length direction of the waveguide.

Meanwhile, since the electromagnetic wave signal transition made in the microstrip-waveguide transition has been described in detail in the "First embodiment" and "Second embodiment" sections, a detailed description thereof will be omitted herein.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A microstrip-waveguide transition for transmission of electromagnetic wave signals, comprising:
    a feeding part for providing an electromagnetic wave signal to be transmitted through the waveguide; and
    a ground part formed at a predetermined interval from the feeding part,
    wherein the microstrip and the waveguide are coupled alongside each other along a length direction of the waveguide, and
    wherein a distance between the feeding part and the ground part in a direction perpendicular to the length direction of the waveguide is greater as it is closer to the waveguide.

2. The microstrip-waveguide transition of claim 1, wherein a distance between the feeding part and the ground part in a direction parallel to or substantially parallel to a width direction of the waveguide is greater as it is closer to the waveguide, and
    wherein an electromagnetic wave that forms an electric field in a direction parallel to or substantially parallel to the width direction of the waveguide is radiated as the electromagnetic wave signal is propagated along the feeding part.

3. The microstrip-waveguide transition of claim 1, wherein a cross-section of the waveguide has a shape longer in a height direction of the waveguide than in a width direction thereof.

4. The microstrip-waveguide transition of claim 1, further comprising:
    a substrate, wherein the feeding part is formed above the substrate and the ground part is formed below the substrate.

5. The microstrip-waveguide transition of claim 4, wherein the substrate consists of a dielectric.

6. The microstrip-waveguide transition of claim 4, further comprising:
    a via array part comprising at least one via formed through at least a part of the substrate along a thickness direction of the substrate and arranged along a length direction of the feeding part or the ground part.

7. A microstrip-waveguide transition for transmission of electromagnetic wave signals, comprising:
    a feeding part for providing an electromagnetic wave signal to be transmitted through the waveguide;
    a ground part formed at a predetermined interval from the feeding part; and
    a via part for electrically connecting the feeding part and the ground part along a height direction of the waveguide,
    wherein the microstrip and the waveguide are coupled alongside each other along a length direction of the waveguide.

8. The microstrip-waveguide transition of claim 7, wherein an electromagnetic wave that forms an electric field in a direction parallel to or substantially parallel to the height direction of the waveguide is radiated as the electromagnetic wave signal is sequentially propagated along the feeding part, the via part, and the ground part.

9. The microstrip-waveguide transition of claim 7, wherein a cross-section of the waveguide has a shape longer in a width direction of the waveguide than in the height direction thereof.

10. A microstrip-waveguide transition for transmission of electromagnetic wave signals, comprising:
    a first substrate;
    a second substrate disposed below the first substrate;
    a feeding part formed above the first substrate to provide an electromagnetic wave signal to be transmitted through the waveguide;
    an intermediate part formed between the first substrate and the second substrate;
    a ground part formed below the second substrate;
    a first via part formed through at least a part of the first substrate and the second substrate along a height direction of the waveguide to electrically connect the feeding part and the intermediate part; and
    a second via part formed through the second substrate along the height direction of the waveguide to electrically connect the intermediate part and the ground part,
    wherein the microstrip and the waveguide are coupled alongside each other along a length direction of the waveguide.

11. The microstrip-waveguide transition of claim 10, wherein a distance from the waveguide to the first via part is greater than that from the waveguide to the second via part.

12. The microstrip-waveguide transition of claim 10, wherein an electromagnetic wave that forms an electric field in a direction parallel to or substantially parallel to the height direction of the waveguide is radiated as the electromagnetic wave signal is sequentially propagated along the feeding part, the first via part, the intermediate part, the second via part, and the ground part.

13. The microstrip-waveguide transition of claim 10, wherein the first substrate and the second substrate consist of a dielectric.

14. The microstrip-waveguide transition of claim 10, further comprising:
    a via array part comprising at least one auxiliary via formed through at least a part of the first substrate and the second substrate along a thickness direction of the first substrate or the second substrate and arranged along a length direction of the feeding part, the intermediate part, and the ground part.

15. A method for transmission of electromagnetic wave signals, comprising the steps of:

generating an electromagnetic wave signal; and propagating the generated electromagnetic wave signal along a feeding part to radiate an electromagnetic wave that forms an electric field in a direction parallel to or substantially parallel to a direction perpendicular to a length direction of a waveguide, wherein a microstrip and the waveguide are coupled alongside each other along the length direction of the waveguide.

* * * * *